(12) United States Patent
Ishihara

(10) Patent No.: US 9,817,743 B2
(45) Date of Patent: Nov. 14, 2017

(54) MAINTENANCE APPARATUS OF ELECTRONIC DEVICE, MAINTENANCE METHOD OF ELECTRONIC DEVICE, AND NON-TRANSITORY COMPUTER READABLE MEDIUM STORING PROGRAM

(75) Inventor: Shingo Ishihara, Tokyo (JP)

(73) Assignee: NEC PLATFORMS, LTD., Kanagawa (JP)

(*) Notice: Subject to any disclaimer, the term of this patent is extended or adjusted under 35 U.S.C. 154(b) by 788 days.

(21) Appl. No.: 13/603,542

(22) Filed: Sep. 5, 2012

(65) Prior Publication Data

US 2013/0060525 A1 Mar. 7, 2013

(30) Foreign Application Priority Data

Sep. 6, 2011 (JP) ................................. 2011-194241

(51) Int. Cl.
*G06F 11/30* (2006.01)

(52) U.S. Cl.
CPC ...... *G06F 11/3093* (2013.01); *G06F 11/3024* (2013.01); *G06F 11/3062* (2013.01)

(58) Field of Classification Search
CPC ............. G06F 11/3024; G06F 11/3093; G06F 11/3062
USPC ....................................................... 702/186
See application file for complete search history.

(56) References Cited

U.S. PATENT DOCUMENTS

| 6,789,207 | B1 | 9/2004 | Maejima | |
|---|---|---|---|---|
| 2002/0101715 | A1* | 8/2002 | Osecky et al. | 361/687 |
| 2006/0280019 | A1* | 12/2006 | Burton et al. | 365/226 |
| 2007/0018003 | A1* | 1/2007 | Jeong | 235/492 |

(Continued)

FOREIGN PATENT DOCUMENTS

| JP | 2001-505676 A | 4/2001 |
|---|---|---|
| JP | 3857052 B2 | 12/2006 |
| JP | 2007278105 A | 10/2007 |

(Continued)

OTHER PUBLICATIONS

Zhang et al., "Scheduled Voltage Scaling for Increasing Lifetime in the Presence of NBTI", Proceedings of the ASP-DAC 2009, 14th Asia and South Pacific Design Automation Conference 2009, Japan, Institute of Electrical and Electronics Engineers, Jan. 19-22, 2009,14th ASP-DAC (2009), pp. 492-497. Cited in the JP Office Action.

(Continued)

*Primary Examiner* — Stephanie Bloss

(57) ABSTRACT

Provided is a technique of compensating time degradation of a CPU and maintaining performance of an electronic device without disturbing a normal operation of the electronic device. A maintenance apparatus includes: a degradation information acquisition unit that acquires degradation information from a sensor circuit integrated in a CPU when the CPU performs a normal operation, the degradation information varying according to degradation of the CPU; a degradation level determination unit that determines a degradation level based on the degradation information, the degradation level indicating a degree of progression of degradation of the CPU; and a power supply control unit that controls a power supply to increase a power supply voltage applied to the CPU with increasing the degradation level.

5 Claims, 11 Drawing Sheets

(56) References Cited

U.S. PATENT DOCUMENTS

2009/0268333 A1    10/2009  Haga

FOREIGN PATENT DOCUMENTS

| JP | 2008-544355 A | 12/2008 |
| JP | 2009250959 A | 10/2009 |
| JP | 2009267660 A | 11/2009 |
| JP | 2010-16653 A | 1/2010 |
| JP | 2010203816 A | 9/2010 |

OTHER PUBLICATIONS

Japanese Office Action for JP Application No. 2011-194241 dated Aug. 27, 2013 with English Translation.

\* cited by examiner

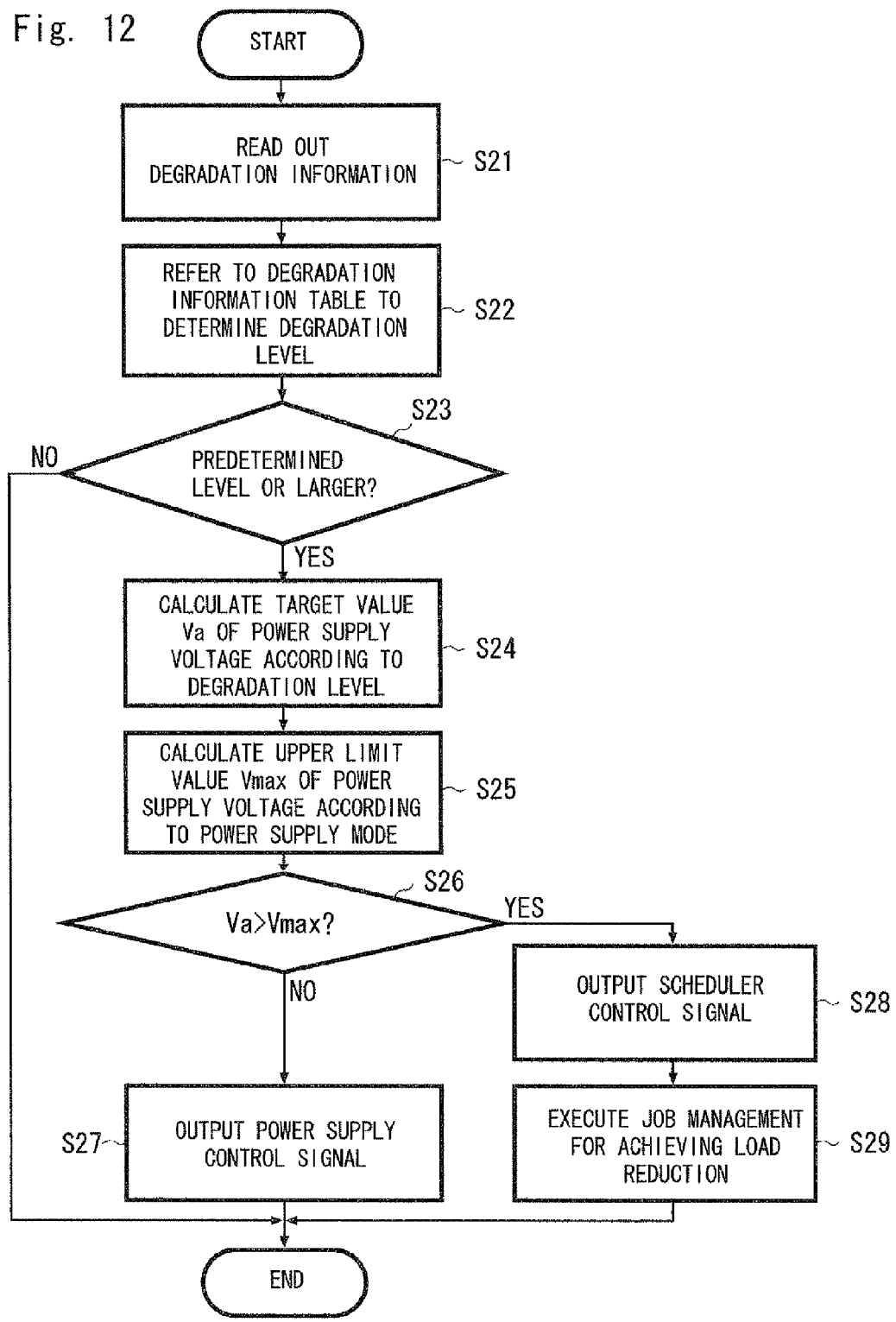

MAINTENANCE APPARATUS OF ELECTRONIC DEVICE, MAINTENANCE METHOD OF ELECTRONIC DEVICE, AND NON-TRANSITORY COMPUTER READABLE MEDIUM STORING PROGRAM

INCORPORATION BY REFERENCE

This application is based upon and claims the benefit of priority from Japanese patent application No. 2011-194241, filed on Sep. 6, 2011, the disclosure of which is incorporated herein in its entirety by reference.

BACKGROUND OF THE INVENTION

1. Technical Field

The present invention relates to a maintenance apparatus to maintain performance of an electronic device, and more specifically, to a maintenance apparatus that deals with time degradation of a central processing unit (CPU).

2. Background Art

Performance of an electronic device such as a computer is degraded according to degradation of a CPU that is built therein. One known cause that leads to degradation of the CPU is hot carrier effects caused by time degradation of a semiconductor device such as a transistor.

Japanese Unexamined Patent Application Publication No. 2010-203816 discloses a degradation diagnosis apparatus that detects degradation (correlative degradation) of a subject that correlatively degrades with a processing apparatus which is a target of inspection, and performs inspection of the processing apparatus when the correlative degradation is detected. This configuration aims to perform a diagnosis operation in an appropriate period.

Japanese Unexamined Patent Application Publication No. 2007-278105 discloses a system that diagnoses degradation of machines. This system measures phenomena indicating degradation (accidental fire or the like) and calculates using the measurement value as a parameter to diagnoses degradation.

Japanese Unexamined Patent Application Publication No. 2009-250959 discloses a system that monitors temporal degradation of a gas-phase adsorbing filter installed in a case or the like. This system detects the amount of a gas-phase material in the case and determines degradation of the filter based on the detection amount and information indicating a predetermined correlation.

Japanese Unexamined Patent Application Publication No. 2009-267660 discloses an image processing apparatus including a hard disk device. In this configuration, when the hard disk device is judged to be degraded more than a predetermined standard, a job is executed under a control which is different from a control employed when the hard disk device is judged not to be degraded more than the standard.

Japanese Patent No. 3857052 discloses a microprocessor that supplies, to each circuit block, a plurality of power supply voltages having different values by switching them, and a plurality of clocks having different frequencies by switching them. This configuration aims to operate a specific circuit block with high speed without increasing power consumption.

The degradation of the CPU (reduction in processing capacity) due to the hot carrier effects stated above can often be solved by increasing a power supply voltage applied to the CPU. Accordingly, it is considered that, upon detection of a failure due to the degradation of the CPU, for example, such a control is performed to increase the power supply voltage to the CPU when the electronic device is restarted, thereby being able to recover functions of the CPU (electronic device).

However, such a treatment that requires the restart operation greatly impedes a smooth use of the electronic device.

Further, according to the related arts, job management processing by a job scheduler has been executed without considering degradation of the CPU stated above. Thus, jobs are allocated to the CPU whose processing capacity is reduced due to degradation in the similar way to the case before the degradation occurs. This is considered to lead further defects on the operation of the electronic device.

The present invention aims to provide a technique of compensating time degradation of a CPU and to maintain performance of an electronic device without disturbing a normal operation of the electronic device.

SUMMARY

A first exemplary aspect of the present invention is a maintenance apparatus of an electronic device including: a degradation information acquisition unit that acquires degradation information from a sensor integrated in a CPU when the CPU performs a normal operation, the degradation information varying according to degradation of the CPU; a degradation level determination unit that determines a degradation level based on the degradation information, the degradation level indicating a degree of progression of degradation of the CPU; and a power supply control unit that controls a power supply to increase a power supply voltage applied to the CPU with increasing the degradation level.

Further, a second exemplary aspect of the present invention is a maintenance method of an electronic device including: a degradation information acquisition step that acquires degradation information from a sensor integrated in a CPU when the CPU performs a normal operation, the degradation information varying according to degradation of the CPU; a degradation level determination step that determines a degradation level based on the degradation information, the degradation level indicating a degree of progression of degradation of the CPU; and a power supply control step that controls a power supply to increase a power supply voltage applied to the CPU with increasing the degradation level.

Further, a third exemplary aspect of the present invention is a non-transitory computer readable medium storing a maintenance program of an electronic device that causes a computer to execute the maintenance method stated above.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 12 is a flowchart showing an operation by the maintenance apparatus according to the third exemplary embodiment.

EXEMPLARY EMBODIMENT

First Exemplary Embodiment

Figure 1:
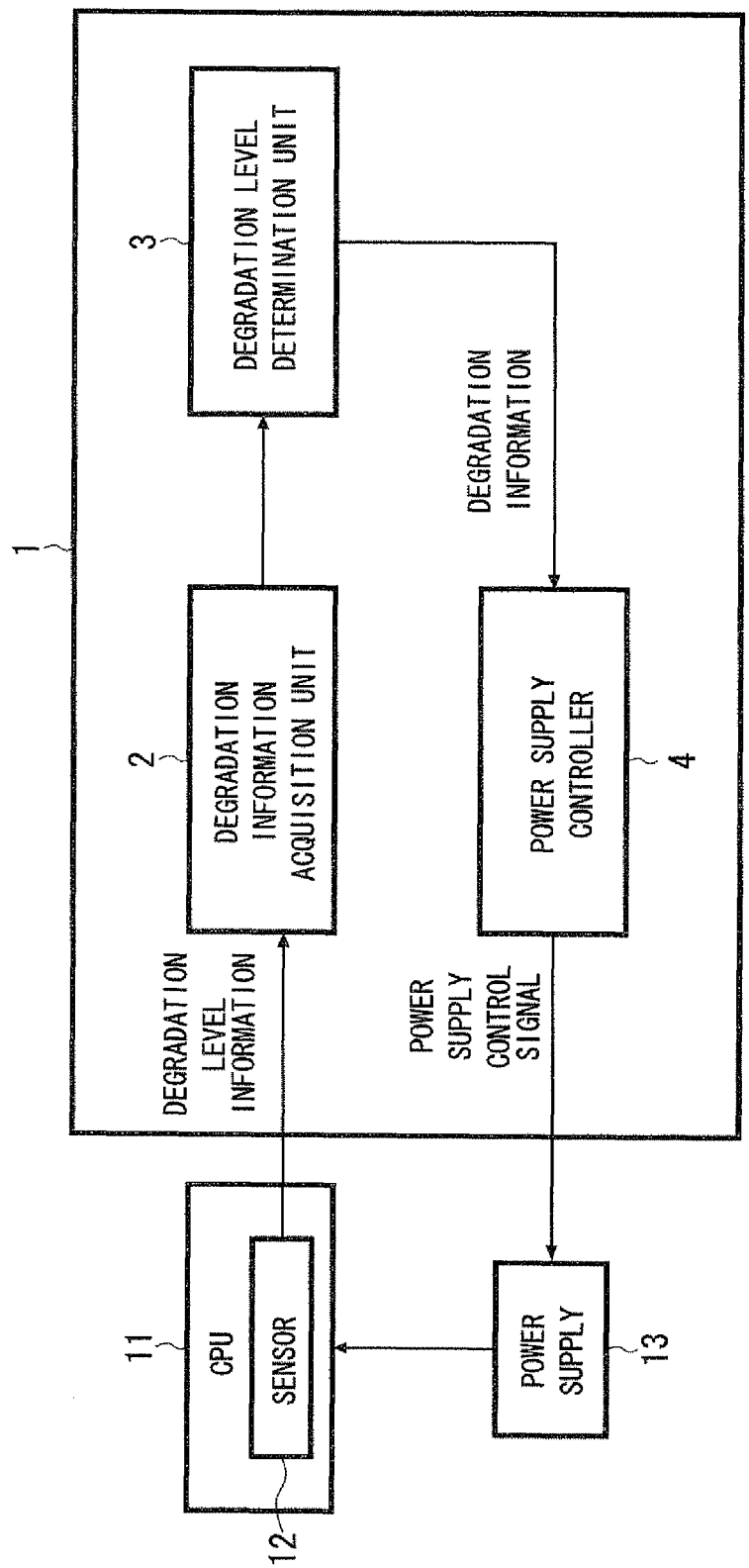
FIG. 1 is a diagram showing a configuration of a maintenance apparatus of an electronic device according to a first exemplary embodiment of the present invention.

Hereinafter, exemplary embodiments of the present invention will be described with reference to the drawings. The components that achieve the same or similar effects are denoted by the same reference symbols, and description thereof will be omitted. FIG. 1 shows a configuration of a maintenance apparatus 1 of an electronic device according to a first exemplary embodiment of the present invention. The maintenance apparatus 1 includes a degradation information acquisition unit 2, a degradation level determination unit 3, and a power supply controller 4.

The degradation information acquisition unit 2 acquires degradation information that varies according to degradation of a CPU 11 from a sensor circuit 12 installed in the CPU 11 included in the electronic device. The degradation information acquisition unit 2 executes an operation to acquire the degradation information when the electronic device (CPU 11) performs a normal operation (including the time of start-up). In short, the acquisition of the degradation information is executed while the electronic device executes the normal operation, e.g., at regular intervals. The degradation information is information read out from the sensor circuit 12, and preferably includes delay time that varies according to the degree of progression of time degradation of the CPU 11, information correlated to the delay time or the like, for example. The degradation information acquisition unit 2 is typically formed by collaboration of a microprocessor, a control/operation program, a device for signal transmission and the like. In the present invention, the number of CPUs 11 is not limited to one. Similarly, the number of sensor circuits 12 included in the CPU 11 is not limited to one.

The degradation level determination unit 3 determines a degradation level indicating a degree of progression of degradation of the CPU 11 based on the degradation information acquired by the above degradation information acquisition unit 2. The degradation level determination unit 3 may be formed by collaboration of a microprocessor, a control/operation program and the like, as is similar to the degradation information acquisition unit 2. The degradation level determination unit 3 performs processing to convert the degradation information supplied from the degradation information acquisition unit 2 into the degradation level using a conversion table or the like that is prepared in advance, for example. It is assumed that, in the specification and claims, the degradation of the CPU 11 is large when the degradation level is large, and the degradation of the CPU 11 is small when the degradation level is small.

The power supply controller 4 controls a power supply 13 so as to increase a power supply voltage applied to the CPU 11 with increasing the degradation level. The power supply controller 4 may be formed by collaboration of a microprocessor, a control/operation program and the like, as is similar to the degradation information acquisition unit 2 and the degradation level determination unit 3.

According to the configuration stated above, the power supply voltage supplied to the CPU 11 increases as degradation of the CPU 11 proceeds. Accordingly, it is possible to maintain the performance of the CPU 11 in a good state even when there occurs performance degradation due to hot carrier effects or the like. Further, the processing of achieving an appropriate power supply voltage can be executed even when the electronic device is normally operated. Accordingly, it is possible to maintain or recover the performance of the electronic device without requiring restart of the electronic device.

Figure 2:
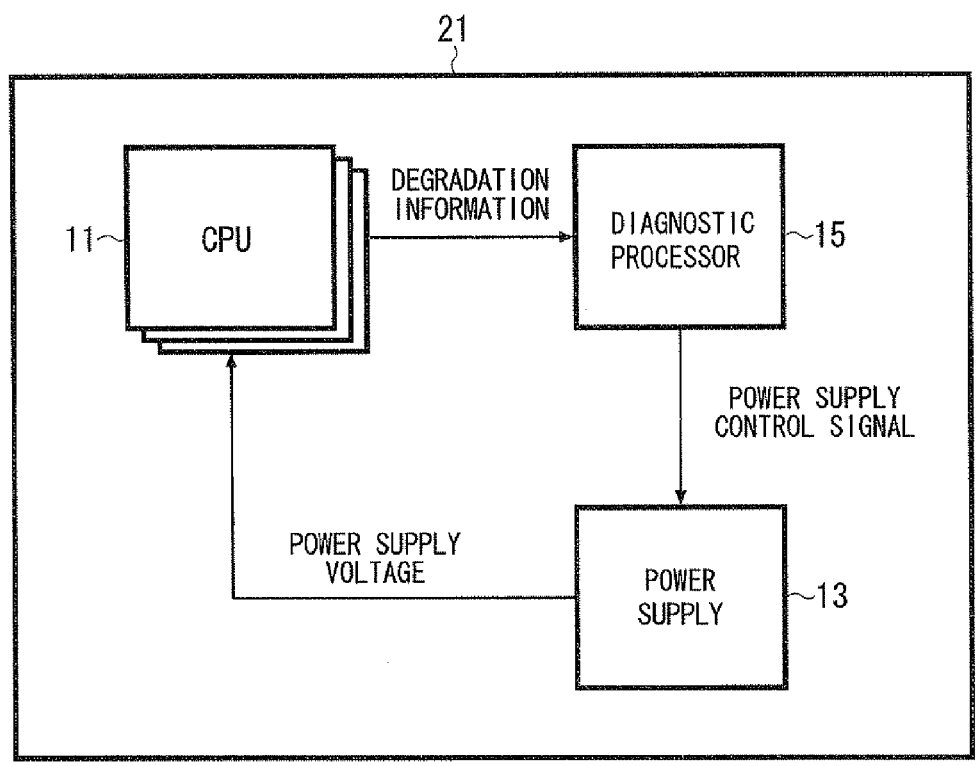
FIG. 2 is a diagram showing a configuration of the electronic device to which the maintenance apparatus according to the first exemplary embodiment is applied.

FIG. 2 shows an example of the configuration of an electronic device 21 to which the maintenance apparatus 1 is applied. The electronic device 21 includes a plurality of CPUs 11, a power supply 13, and a diagnostic processor 15.

The diagnostic processor 15 is a microprocessor that operates according to a control/operation program. The diagnostic processor 15 receives the degradation information (output signal from the sensor circuit 12), generates a power supply control signal, and outputs the power supply control signal.

Figure 3:
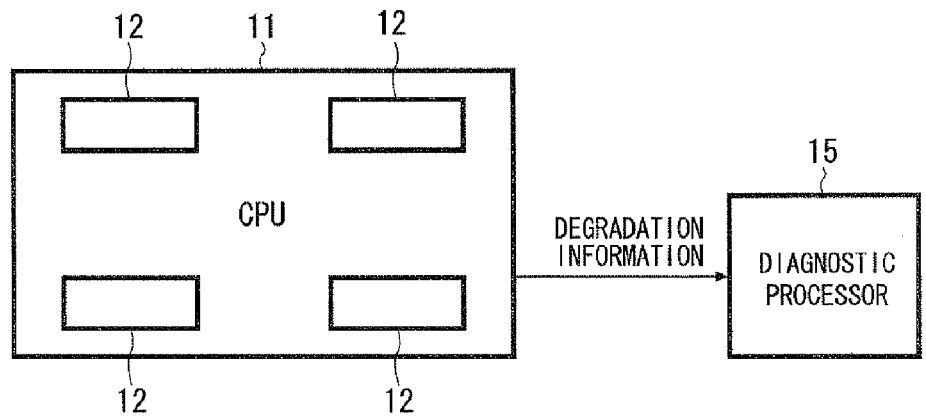
FIG. 3 is a diagram showing a configuration of a CPU according to the first exemplary embodiment.

FIG. 3 shows a configuration of the CPU 11 in the example shown in FIG. 2. The CPU 11 includes a plurality of sensor circuits 12 therein. Each of the sensor circuits 12 is provided for each functional block of the CPU 11, for example. An output signal from each of the sensor circuits 12 is supplied to the diagnostic processor 15 as the degradation information. Accordingly, the diagnostic processor 15 is able to acquire the degradation information for each functional block.

Figure 4:
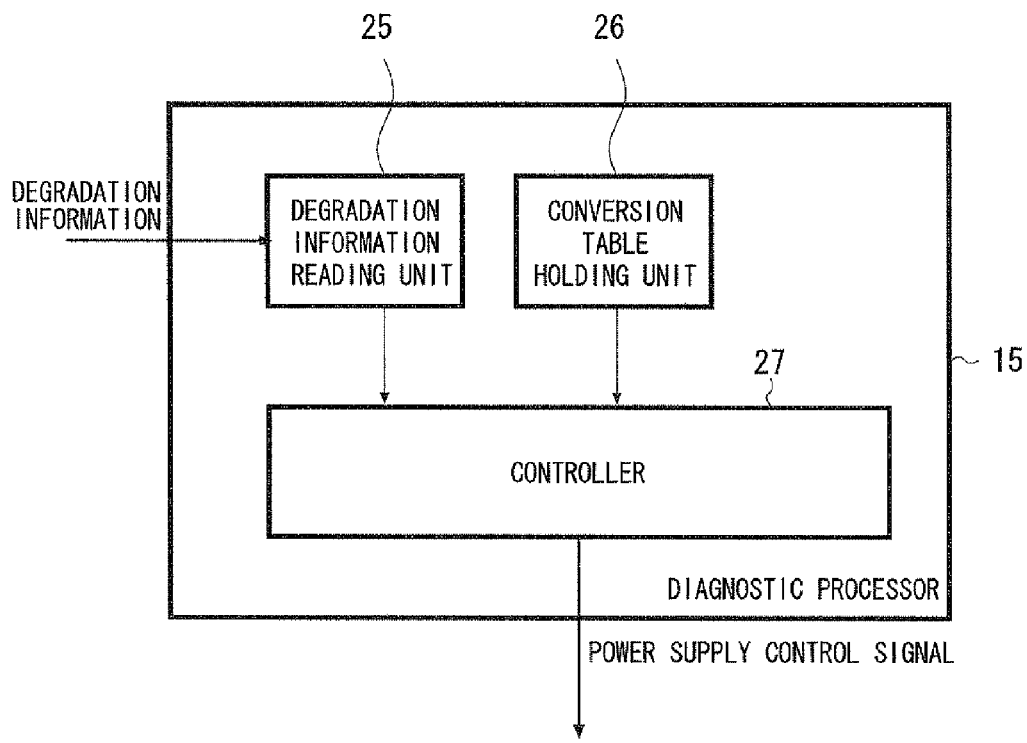
FIG. 4 is a diagram showing a functional configuration of a diagnostic processor according to the first exemplary embodiment.

FIG. 4 shows a functional configuration of the diagnostic processor 15. The diagnostic processor 15 includes a degradation information reading unit 25, a conversion table holding unit 26, and a controller 27.

The degradation information reading unit 25 receives the degradation information (output signal from each of the sensor circuits 12) at regular intervals, and outputs them to the controller 27.

The conversion table holding unit 26 holds the conversion table that converts the degradation information into the degradation level stated above. The conversion table indicates, for example, a correlation between the degradation level and the delay time varying depending on the degree of progression of the time degradation of the CPU 11. Such a conversion table may be created, for example, based on a logical calculation formula or the like based on a known degradation mechanism as a result of an accelerated degradation test of a semiconductor element such as a transistor or the like. With the use of the conversion table, it is possible to convert the degradation information acquired from the CPU 11 into the degradation level. Note that the method of determining the degradation level is only an example. Even with another method that makes it possible to appropriately express degradation of the CPU 11, it is possible to achieve the technical object (adjusting the power supply voltage according to degradation of a CPU to maintain functions of the CPU) of the present invention.

The controller 27 determines the degradation level based on the degradation information and the conversion table. Then, the controller 27 calculates a target value of the power supply voltage according to the degradation level, generates the power supply control signal to achieve the target value, and outputs the power supply control signal to the power supply 13.

Figure 5:
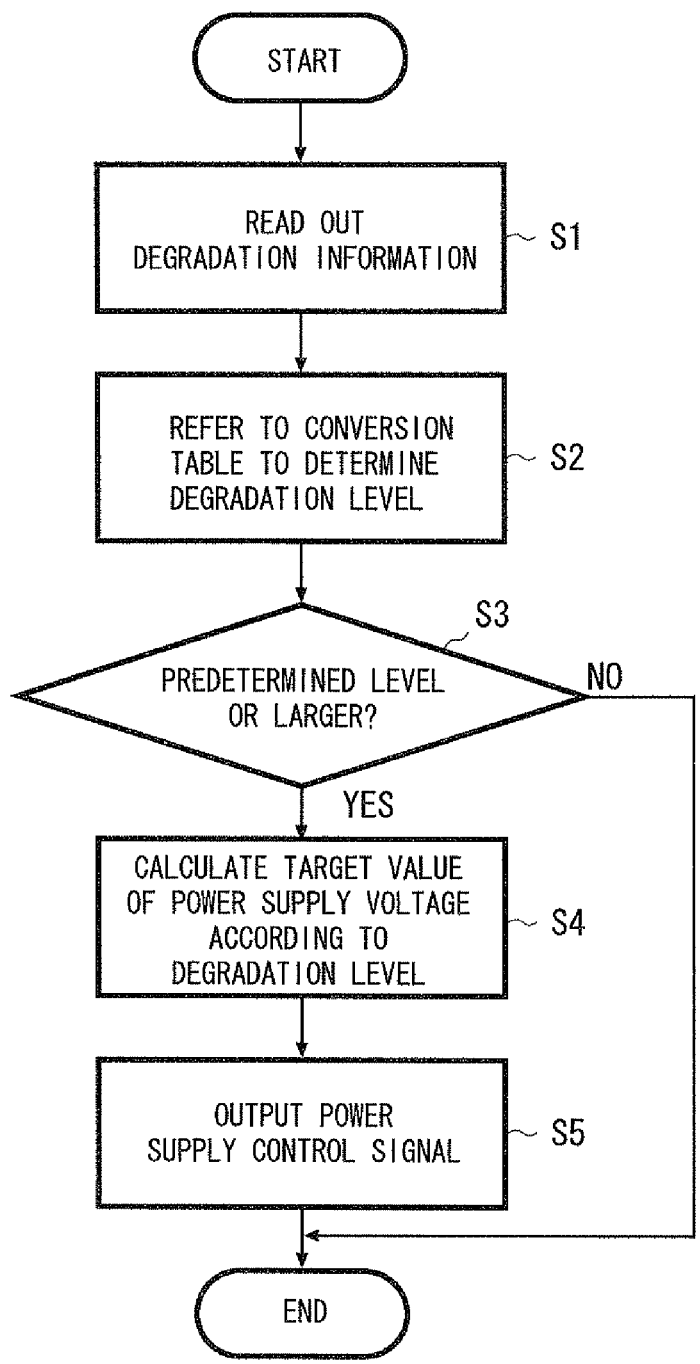
FIG. 5 is a flowchart showing an operation by the maintenance apparatus according to the first exemplary embodiment.

FIG. 5 shows a process flow by the maintenance apparatus 1. First, the diagnostic processor 15 reads out the degradation information of each CPU 11 (S1). This reading processing is executed when the CPU 11 performs the normal operation, e.g., at regular intervals.

Next, the degradation level of the CPU 11 is determined based on the degradation information that is read out and the conversion table (S2). This degradation level is determined for each CPU 11.

Then, it is determined whether the degradation level that is determined is equal to or larger than a predetermined level (S3). The predetermined level indicates a minimum value of the degradation level in which an increase in the power supply voltage is required. When it is determined in Step S3 that the degradation level is not equal to or larger than the predetermined level (NO), this routine is ended. On the other hand, when it is determined in Step S3 that the degradation level is equal to or larger than the predetermined level (YES), the target value of the power supply voltage according to the degradation level is calculated (S4), and the power supply control signal to achieve the target value is output to the power supply 13 (S5).

According to the configuration and the operation described above, the power supply voltage of the CPU 11 where degradation is found among the plurality of CPUs 11 is increased according to its degradation level. Accordingly, it is possible to compensate the performance degradation due to hot carrier effects or the like, to maintain the functions of the CPU 11 in a good state. Further, the processing of achieving an appropriate power supply voltage may also be executed even in the normal operation of each CPU 11. Thus, it is possible to maintain or recover the performance of the electronic device 21 without requiring the need to restart the electronic device 21.

Second Exemplary Embodiment

Figure 6:
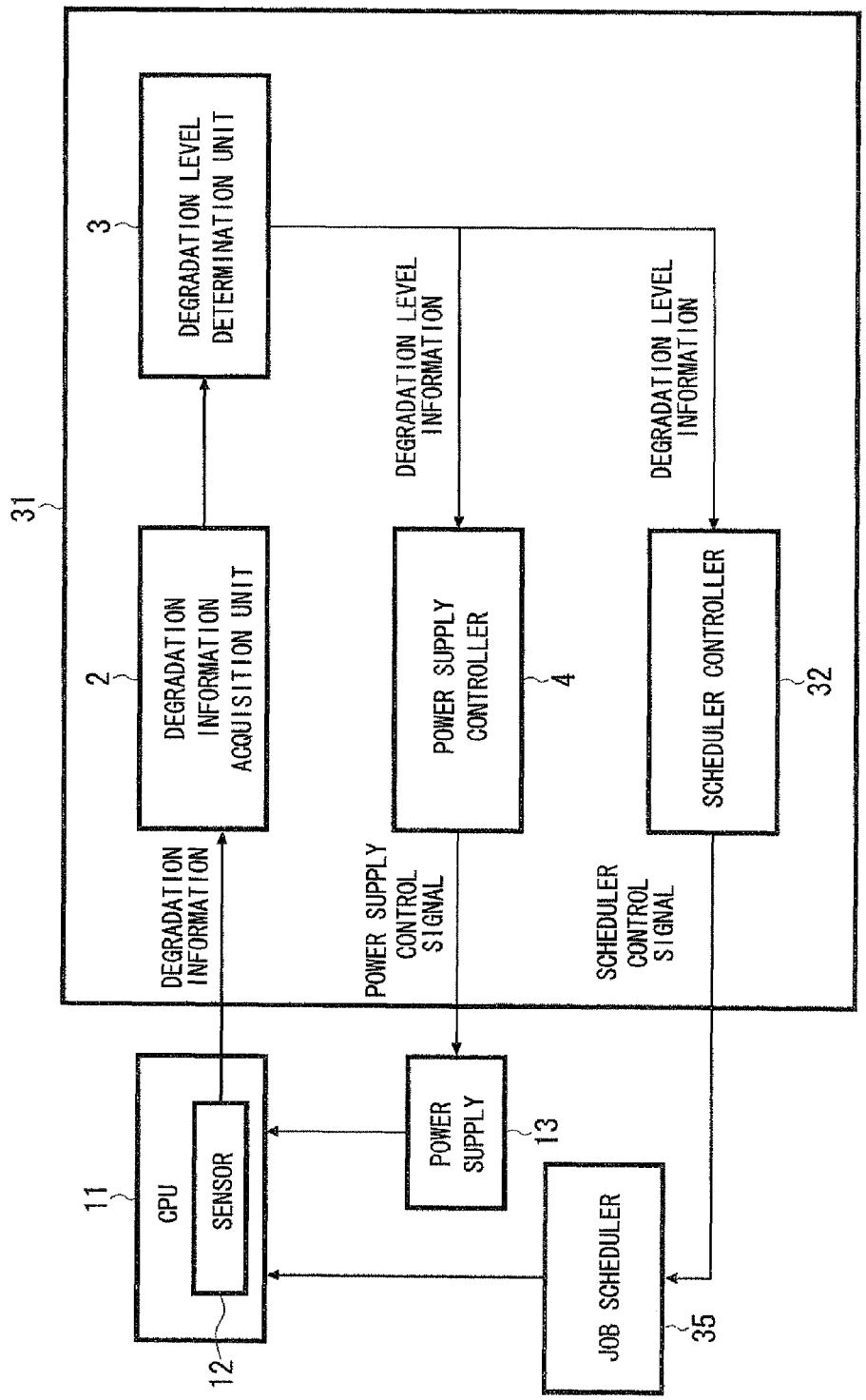
FIG. 6 is a diagram showing a configuration of a maintenance apparatus of an electronic device according to a second exemplary embodiment of the present invention.

FIG. 6 shows a configuration of a maintenance apparatus 31 of an electronic device according to a second exemplary embodiment of the present invention. The maintenance apparatus 31 includes a scheduler controller 32 in addition to the degradation information acquisition unit 2, the degradation level determination unit 3, and the power supply controller 4 that are stated above.

The scheduler controller 32 controls a job scheduler 35 included in the electronic device. The scheduler controller 32 may be formed by collaboration of a microprocessor, a control/operation program and the like, as is similar to the degradation information acquisition unit 2, the degradation level determination unit 3, and the power supply controller 4. The scheduler controller 32 controls the job scheduler 35 so that the processing load of the CPU 11 decreases with increasing the degradation level.

According to the configuration stated above, the progress of the degradation of the CPU 11 causes an increase in the power supply voltage by the power supply controller 4 and mitigation of the processing load of the CPU 11 by the scheduler controller 32. According to such a configuration, when there are a plurality of CPUs 11, the load of the CPU 11 where degradation is found is reduced, and a part or all of the jobs whose loads are reduced is allocated to the other CPUs 11 where no degradation is found, thereby being able to maintain the performance as the whole electronic device.

Figure 7:
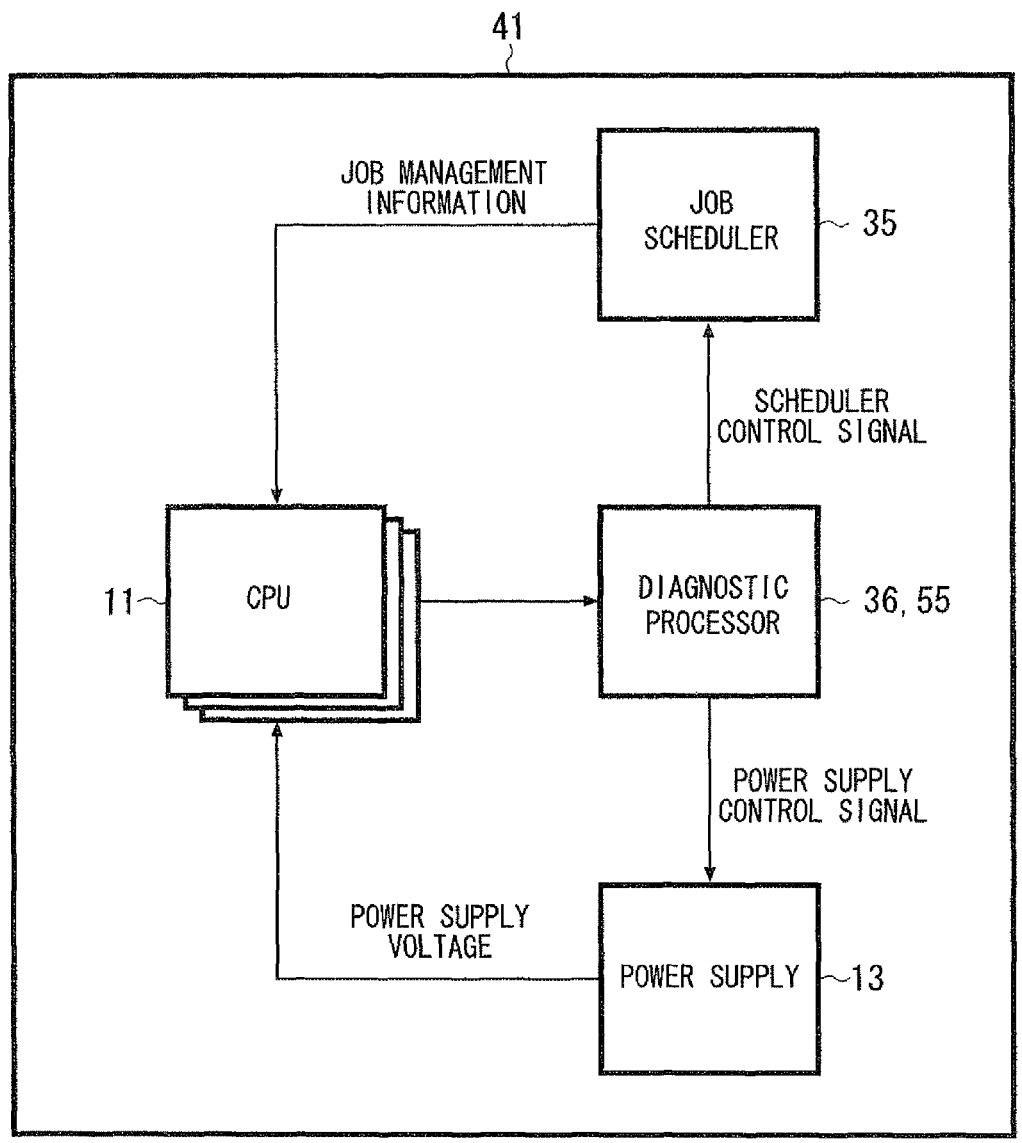
FIG. 7 is a diagram showing a configuration of the electronic device to which the maintenance apparatus according to the second exemplary embodiment is applied.

FIG. 7 shows an example of a configuration of an electronic device 41 to which the maintenance apparatus 31 described above is applied. The electronic device 41 includes a plurality of CPUs 11, a power supply 13, a job scheduler 35, and a diagnostic processor 36.

The diagnostic processor 36 receives the degradation information output from the CPU 11, generates a power supply control signal and a scheduler control signal, and outputs these signals. The job scheduler 35 generates job management information based on normal job management rules and the scheduler control signal from the diagnostic processor 36 to output the job management information to the CPU 11.

Figure 8:
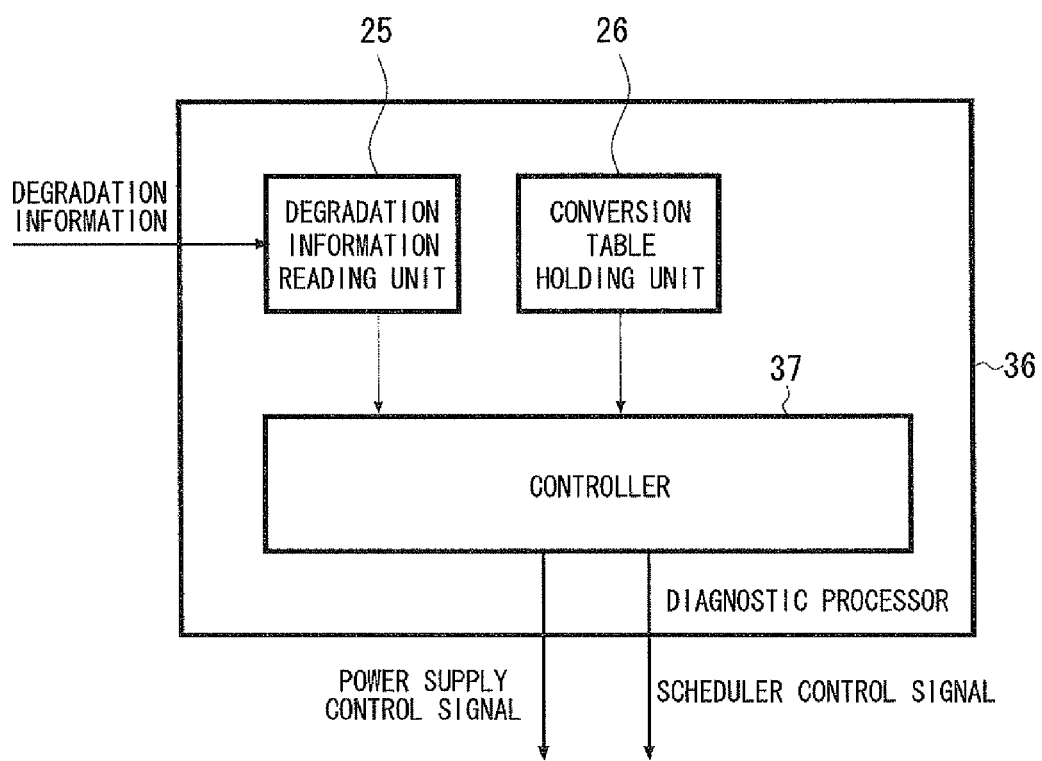
FIG. 8 is a diagram showing a functional configuration of a diagnostic processor according to the second exemplary embodiment.

FIG. 8 shows a functional configuration of the diagnostic processor 36. The diagnostic processor 36 includes a degradation information reading unit 25, a conversion table holding unit 26, and a controller 37. The controller 37 of the diagnostic processor 36 determines the degradation level based on the degradation information and the conversion table, as is similar to the controller 27 of the diagnostic processor 15 according to the first exemplary embodiment. The difference between the controller 37 and the controller 27 is that the controller 37 generates and outputs the scheduler control signal according to the degradation level.

Figure 9:
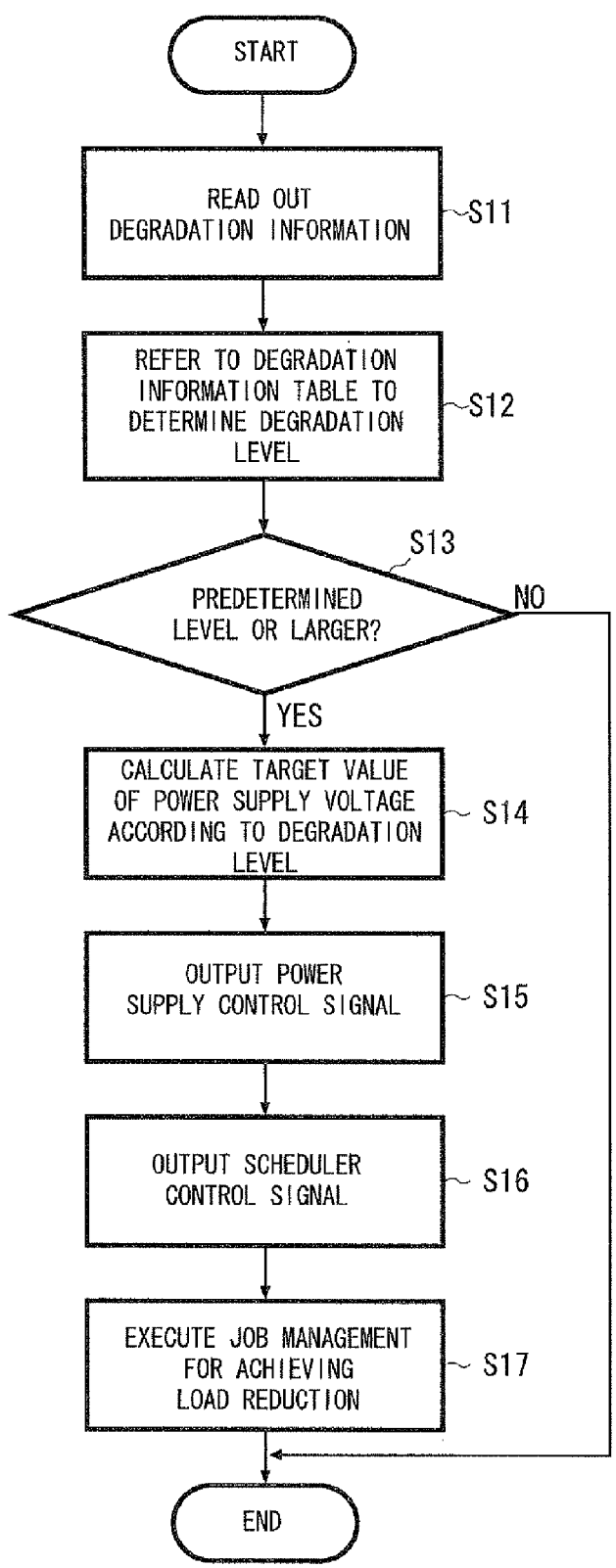
FIG. 9 is a flowchart showing an operation by the maintenance apparatus according to the second exemplary embodiment.

FIG. 9 shows a process flow by the maintenance apparatus 31. First, the diagnostic processor 36 reads out the degradation information of each CPU 11 (S11). This reading processing is executed when the CPU 11 performs the normal operation, e.g., at regular intervals.

Next, the degradation level of the CPU 11 is determined based on the degradation information that is read out and the conversion table (S12). This degradation level is determined for each CPU 11.

Then, it is determined whether the degradation level that is determined is equal to or larger than a predetermined level (S13). When it is determined in Step S13 that the degradation level is not equal to or larger than the predetermined level (NO), this routine is ended. On the other hand, when it is determined in Step S13 that the degradation level is equal to or larger than the predetermined level (YES), the target value of the power supply voltage according to the degradation level is calculated (S14), and the power supply control signal to achieve the target value is output to the power supply 13 (S15).

Further, the scheduler control signal to reduce the processing load of the CPU 11 where degradation is found according to the degradation level is generated, and the scheduler control signal is output to the job scheduler 35 (S16).

Last, the job scheduler 35 executes the job management for achieving the load reduction processing of the CPU 11 where degradation is found according to the scheduler control signal (S17).

According to the configuration and the operation stated above, in addition to the processing for achieving an appropriate power supply voltage described above, reduction of the processing load is performed on the CPU 11 where degradation is found. Then, by allocating a part or all of the jobs whose loads are reduced to other CPUs 11 where no degradation is found, it is possible to maintain the performance as the whole electronic device 41.

Third Exemplary Embodiment

Figure 10:
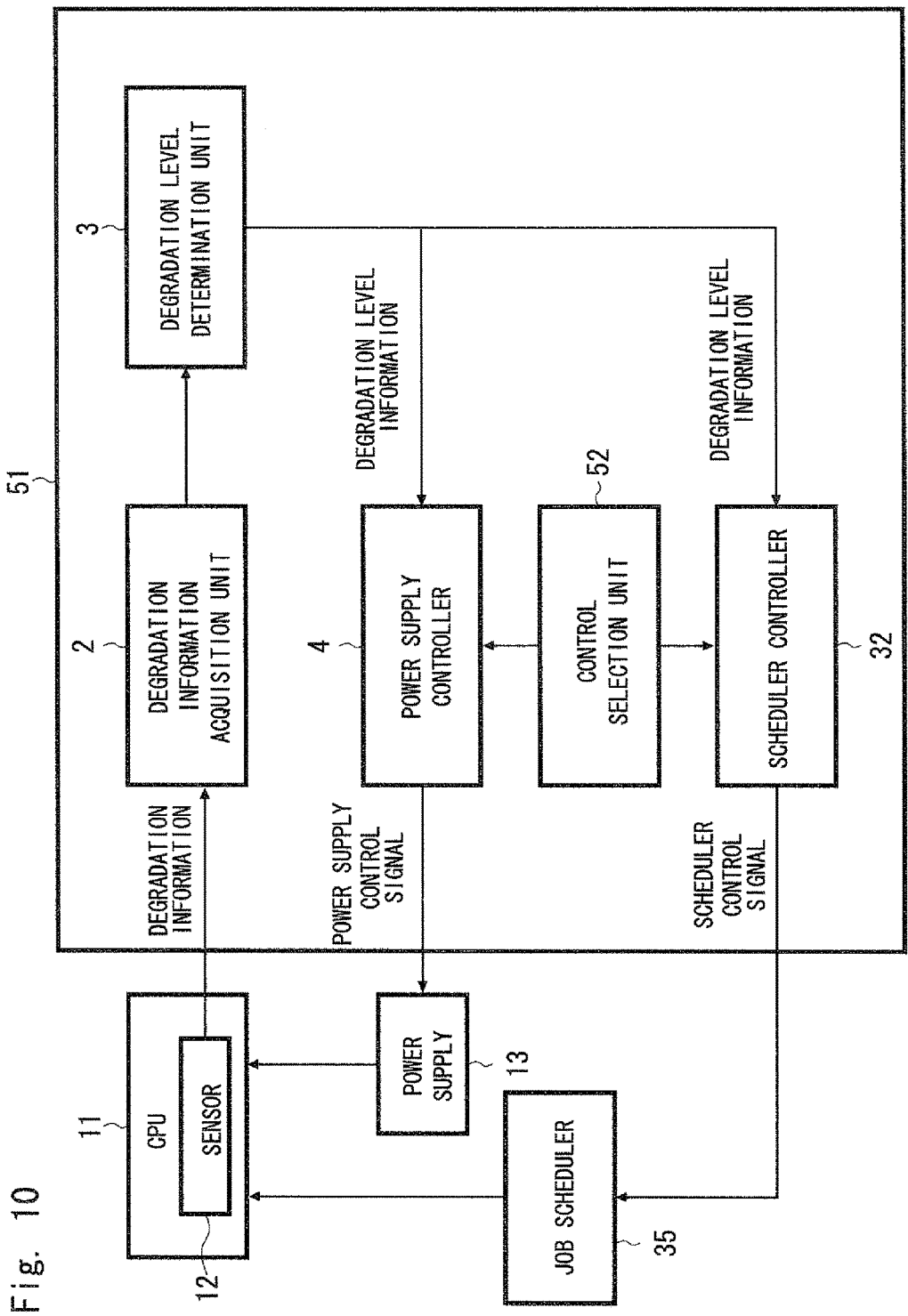
FIG. 10 is a diagram showing a configuration of a maintenance apparatus of an electronic device according to a third exemplary embodiment of the present invention.

FIG. 10 shows a configuration of a maintenance apparatus 51 of an electronic device according to a third exemplary embodiment of the present invention. The maintenance apparatus 51 is different from the maintenance apparatus 31 according to the second exemplary embodiment in that the maintenance apparatus 51 includes a control selection unit 52.

When the target value of the power supply voltage calculated by the power supply controller 4 according to the degradation level is larger than an upper-limit value of the power supply voltage determined according to a power supply mode such as a power saving mode, the control selection unit 52 does not perform control by the power supply controller 4 (control to increase the power supply voltage according to the increase in the degradation level) but performs control by the scheduler controller 32 (control to reduce the processing load of the CPU 11 according to the degradation level). The control selection unit 52 may be formed by collaboration of a microprocessor, a control/operation program and the like, as is similar to the degradation information acquisition unit 2, the degradation level determination unit 3, the power supply controller 4, and the scheduler controller 32.

According to the configuration stated above, the control by the scheduler controller 32 is executed only when it is impossible to execute the control by the power supply controller 4. For example, when the electronic device executes the power saving mode, for example, restrictions are imposed on the increase in the power supply voltage. In such a case, it is possible to solve the problems by controlling the job scheduling instead of solving the problems by controlling the power supply voltage.

Figure 11:
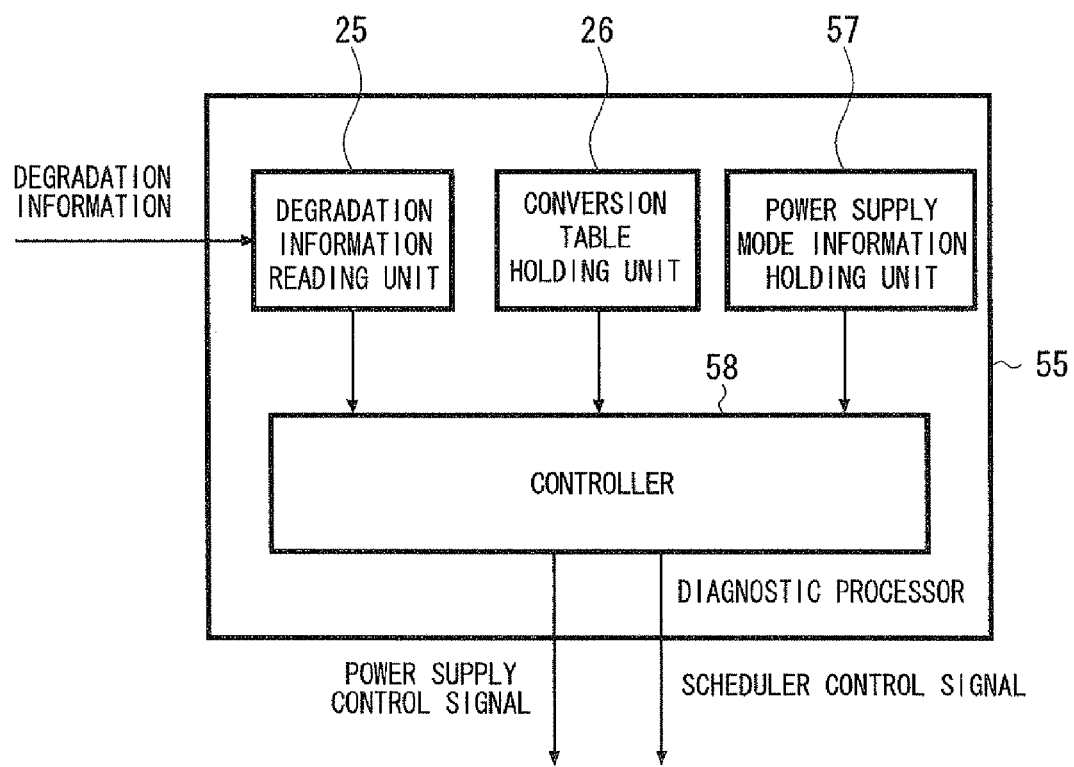
FIG. 11 is a diagram showing a functional configuration of a diagnostic processor according to the third exemplary embodiment.

FIG. 11 shows a functional configuration of a diagnostic processor 55 according to the third exemplary embodiment. The diagnostic processor 55 is used in place of the diagnostic processor 36 of the electronic device 41 according to the second exemplary embodiment shown in FIG. 7.

The diagnostic processor 55 shown in FIG. 11 includes a degradation information reading unit 25, a conversion table holding unit 26, a power supply mode information holding unit 57, and a controller 58.

The power supply mode information holding unit 57 holds information regarding the power supply mode (e.g., power saving mode) that imposes restrictions on the power supply voltage. The upper-limit value of the power supply voltage is determined according to the power supply mode which is being executed.

The controller 58 calculates the target value of the power supply voltage based on the degradation level as described above, to determine whether the target value exceeds the upper-limit value of the power supply voltage. When the target value exceeds the upper-limit value, the controller 58 does not generate and output the power supply control signal, but only generates and outputs the scheduler control signal.

FIG. 12 shows a process flow by the maintenance apparatus 51. First, the diagnostic processor 55 reads out the degradation information of each CPU 11 (S21). This reading processing is executed when the CPU 11 performs the normal operation, e.g., at regular intervals.

Next, the degradation level of the CPU 11 is determined based on the degradation information that is read out and the conversion table (S22). The degradation level is determined for each CPU 11.

Then, it is determined whether the degradation level that is determined is equal to or larger than a predetermined level (S23). When it is determined in Step S23 that the degradation level is not equal to or larger than the predetermined level (NO), this routine is ended. On the other hand, when it is determined in Step S23 that the degradation level is equal to or larger than the predetermined level (YES), a target value Va of the power supply voltage according to the degradation level is calculated (S24), and an upper-limit value Vmax of the power supply voltage according to the power supply mode is calculated (S25).

Next, it is determined whether Va is larger than Vmax (S26). When it is determined in Step S26 that Va is not larger than Vmax (NO), the diagnostic processor 55 outputs to the power supply 13 the power supply control signal to set the power supply voltage to the target value Va (S27).

Meanwhile, when it is determined in Step S26 that Va is larger than Vmax (YES), the diagnostic processor 55 outputs the scheduler control signal stated above to the job scheduler 35 (S28), and the job scheduler 35 executes the job management for achieving the load reduction of the CPU 11 described above (S29).

According to the configuration and the operation stated above, when there is degradation of the CPU 11, the control by the power supply controller 4 is performed in principle. However, when it is difficult to execute the power supply control by executing the power saving mode or the like, processing to reduce the load of the CPU 11 is executed by the scheduler controller 32. Accordingly, it is possible to perform the efficient maintenance operation against degradation of the CPU 11 in the electronic device including a function of switching the mode to the power saving mode.

Note that the present invention is not limited to the exemplary embodiments stated above, but may be changed as appropriate without departing from the spirit of the present invention.

Further, the processing of the maintenance apparatus stated above may be executed by computer programs that are stored in a ROM or the like of a main processor. In the examples stated above, the program including an instruction group to cause a computer (processor) to execute each processing can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk devices, etc.), optical magnetic storage media (e.g. magneto-optical disks), CD-ROM (Read Only Memory), CD-R, CD-R/W, and semiconductor memories (such as mask ROM, PROM (programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

According to the present invention, the degradation level of the CPU is determined when the electronic device performs the normal operation, and processing to maintain or recover the functions of the CPU is executed according to the degradation level. Accordingly, even when there occurs time degradation of the CPU, it is possible to maintain or recover the functions without disturbing the normal operation of the electronic device.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A maintenance apparatus of an electronic device comprising:
    a degradation information acquisition unit that acquires degradation information from a sensor integrated in a CPU when the CPU is in operation, the degradation information including delay time or information correlated to the delay time and varying according to degradation of the CPU;
    a degradation level determination unit that determines a degradation level based on the degradation information, the degradation level indicating a degree of progression of degradation of the CPU;
    a power supply control unit that calculates, based on the degradation level, a target value of a power supply voltage to be applied to the CPU such that a reduction in processing capacity of the CPU caused by the degradation of the CPU is compensated for by increasing the target value in accordance with an increasing of the degradation level, and controls a power supply voltage applied to the CPU based on the target value when the CPU is in operation;
    a scheduler control unit that controls a job scheduler to decrease a processing load of the CPU with increasing the degradation level; and
    a control selection unit that does not execute control by the power supply control unit but executes control by the scheduler control unit when the target value of the power supply voltage calculated according to the degradation level is greater than an upper-limit value of the power supply voltage determined according to a power supply mode.

2. The maintenance apparatus of the electronic device according to claim 1, wherein
    the maintenance apparatus is used for an electronic device including a first and a second CPUs, and
    the scheduler control unit controls the job scheduler so that jobs are allocated preferentially to the first CPU of which the degradation level is lower than that of the second CPU.

3. A maintenance method of an electronic device comprising:
    a degradation information acquisition step that acquires degradation information from a sensor integrated in a CPU when the CPU is in operation, the degradation information varying according to degradation of the CPU;
    a degradation level determination step that determines a degradation level based on the degradation information, the degradation level indicating a degree of progression of degradation of the CPU;
    a calculation step that calculates, based on the degradation level, a target value of a power supply voltage to be applied to the CPU such that a reduction in processing capacity of the CPU caused by the degradation of the CPU is compensated for by increasing the target value in accordance with an increasing of the degradation level;
    a power supply control step that controls a power supply voltage applied to the CPU based on the target value when the CPU is in operation;
    a scheduler control step that controls a job scheduler to decrease a processing load of the CPU with increasing the degradation level; and
    a control selection step that does not execute control by the power supply control step but executes control by the scheduler control step when a target value of the power supply voltage calculated according to the degradation level is greater than an upper-limit value of the power supply voltage determined according to a power supply mode.

4. A non-transitory computer readable medium storing a maintenance program of an electronic device that causes a computer to execute the method according to claim 3.

5. The maintenance method of the electronic device according to claim 3, wherein
    the maintenance method is used for an electronic device including a first and a second CPUs, and
    the scheduler control step controls the job scheduler so that jobs are allocated preferentially to the first CPU of which the degradation level is lower than that of the second CPU.

* * * * *